July 11, 1967 J. C. GEVAS 3,330,945
ACCELERATED NORTH-SEEKING GYROCOMPASSING SYSTEM
Original Filed May 25, 1960 4 Sheets-Sheet 1

JAMES C. GEVAS
INVENTOR.

BY E. L. Masselle
George B. Oujevolk
ATTORNEYS

July 11, 1967   J. C. GEVAS   3,330,945
ACCELERATED NORTH-SEEKING GYROCOMPASSING SYSTEM
Original Filed May 25, 1960   4 Sheets-Sheet 4

JAMES C. GEVAS
INVENTOR.

BY F. L. Masselle
George B. Auyroth
ATTORNEYS ated July 11, 1967

United States Patent Office 3,330,945
Patented July 11, 1967

3,330,945
ACCELERATED NORTH-SEEKING GYRO-COMPASSING SYSTEM
James C. Gevas, Roseland, N.J., assignor to General Precision Inc., Little Falls, N.J., a corporation of Delaware
Original application May 25, 1960, Ser. No. 31,741, now Patent No. 3,222,795, dated Dec. 14, 1965. Divided and this application Oct. 19, 1965, Ser. No. 497,707
1 Claim. (Cl. 235—150.25)

This application is a divisional case of U.S. patent application Ser. No. 31,741, filed May 25, 1960 now Patent No. 3,222,795, patented on Dec. 14, 1965.

This invention generally relates to improved methods and apparatus for establishing true north for use as an azimuth reference, and more specifically is directed to such methods and apparatus that may be employed with conventional inertial guidance systems for missiles and like vehicles wherein it is necessary to establish an azimuth reference quickly and accurately prior to launching.

According to the present invention, there is provided an inmproved method of determining true north employing the principle of measuring the rate of turning of a stable element in space such as a gyro or the like, as this stable element is turned or precessed about its axis in response to angular rotation of the earth. This rate of turning or precession is dependent upon a number of factors comprising the earth's rate of rotation, the latitude position of the stable element, the orientation of the stable element, and its drift rate, all of which are known quantities or readily determinable quantities excepting for the orientation and drift of the stable element. Consequently, by establishing the stable element in an approximate position that would be most sensitive to the earth's rotation, the method of the present invention enables the rapid detection and determination of a true northward course in a minimum of time. Further, since the stable element is gimballed inside three orthogonal axes, the determination of north is rendered less subject to errors caused by local ground vibrations and tremors than in conventional systems.

According to preferred apparatus for practicing the invention such stable elements in the form of gyroscopes or the like are presently available as part of conventional inertial guidance systems employed for the navigation and control of aircraft, missiles, and like vehicles. Accordingly, with but minor additions to such conventional guidance systems, apparatus may be provided for rapidly and easily determining the true north, south, east and west directions and such information may be employed to initially align and correct the inertial guidance system heading as desired.

In the prior art, it is known to provide compassing means in conjunction with a gyro to supply the directional information desired whereby the gyro may be continuously maintained in the correct attitude and north indicating direction. However, known systems of this type require that the gyros and other components be continuously energized and that the system be placed into operation before it is actually needed, when the determination of north may be required rapidly. The difficulty with this arrangement is that the precision gyros and other components, as presently available, have a limited life expectancy and, therefore, continuous operation of these components reduces the useful operating life of the system. On the other hand, it is desired that the guidance system usually be maintained in readiness for substantially immediate operation when the need arises and that unnecessary delays occasioned by warmup and gradual correction and alignment be eliminated or reduced to a minimum.

It is accordingly a principal object of the invention to provide an improved method for rapidly determining true north.

A further object is to provide an improved system for performing this function.

A still further object is to provide such a system for rapidly aligning a conventional gyro controlled inertial guidance system to the true north without prolonged preoperation of the gyros and other components.

A further object is to provide a system for performing this function, which is less subject to errors caused by local ground vibrations and tremors.

Other objects and many additional advantages will be more readily understood by those skilled in the art after a detailed consideration of the following specification taken with the accompanying drawings wherein.

Figure 1:
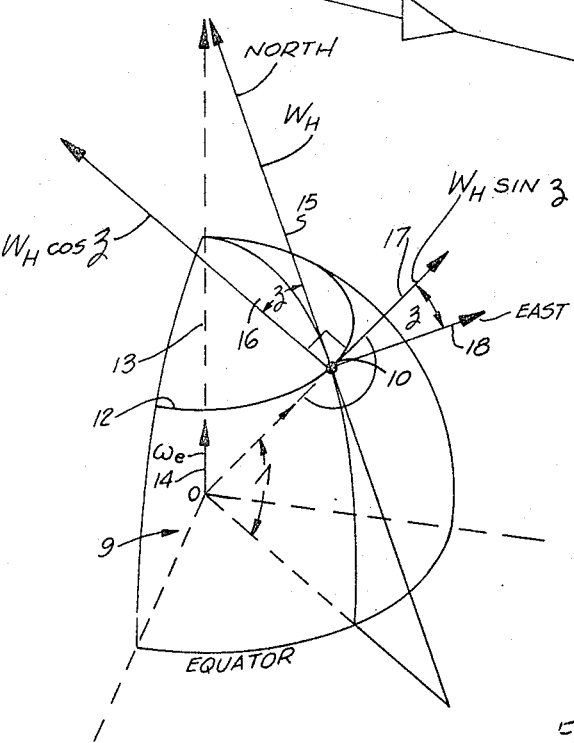
FIG. 1 is a three-dimensional diagrammatic view of a sector of the earth illustrating, in vector form, the angular velocity components at a given point on the earth's surface.

Referring now to the drawings for a consideration of a preferred method of practicing the invention, reference is first made to FIG. 1 illustrating a quadrant of the earth 9 and, by means of a plurality of arrowed lines, the components of the earth's angular velocity at a position 10 on the earth's surface disposed at latitude line 12.

The angular rotation of the earth about its central axis 13 is constant and is conventionally represented by the upright vector 14 labeled $\omega_e$ positioned along this axis 13. At various latitudes on the earth's surface, the component of the earth's inertial velocity presented to an element lying tangent to the earth's surface varies, depends upon the latitude angle $\Lambda$ and the azimuth orientation of the element. For example, a vertical output axis gyroscope positioned at location 10 on the earth's surface and having its input axis directed along north-pointing vector 15 detects the horizontal velocity component $W_H$ which is proportional to the cosine of the angle of latitude $\cos \Lambda$ or $\omega_e$ cosine $\Lambda$ and consequently, if this gyro is precessed to maintain its relative orientation as the earth rotates about its axis 13, the gyro must be precessed or turned at a rate proportional to the inertial velocity experienced.

Returning to FIG. 1 for a continuation of this spherical analysis, a vertical output axis gyro with its sensitive axis 16 displaced from the north pointing axis 15 by an angle $z$ therefore experiences an inertial velocity of $\Lambda W_H \cos z$ and a second vertical output axis gyro with its sensitive axis at right angles to the first, i.e., along axis 17, experiences on earth rate effect equal to $W_H \sin z$, where the angle $z$ is the angle between the sensitive axis along vector 17 and geographical east (shown as vector 18) and is also the angle between sensitive axis 16 and geographical north (shown as vector 15).

As generally indicated above, all of these vectors 15, 16, 17 and 18 lie in the same two dimensional plane that is disposed tangent to the earth at the location 10 on the earth's surface.

According to the present invention, this relationship of the vector components shown in FIG. 1 is employed to determine the unknown angle $z$ existing between the vectors 16 and 15 or between the vectors 17 and 18 to determine the true northward direction.

Figure 5:
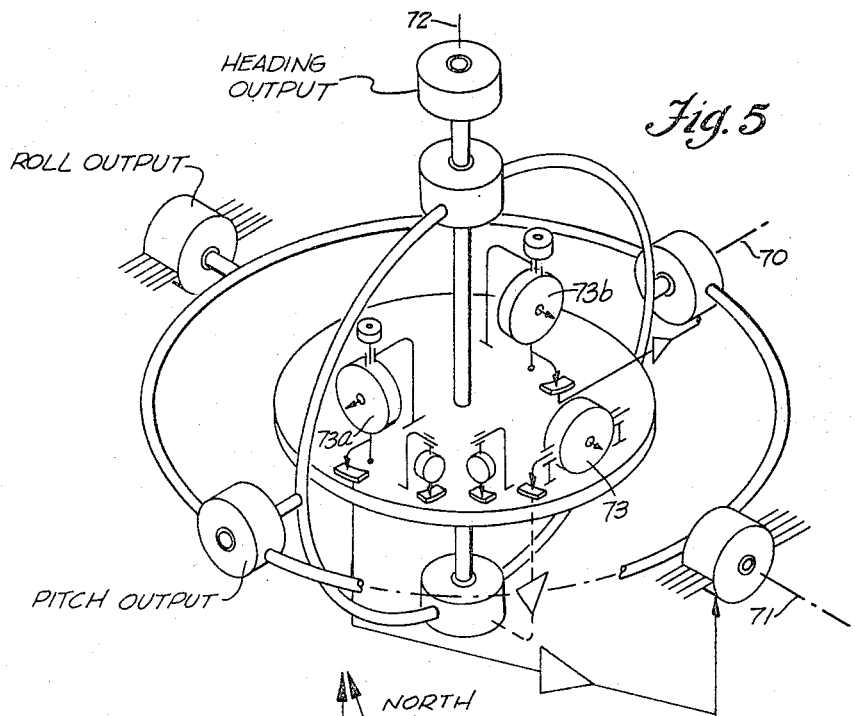
FIG. 5 is a schematic drawing of a platform fitted with three gimbals and three gyros.

More specifically, according to one preferred method of practicing the invention, one of the two vertical output axis gyros, on a three gyro, three gimbal platform, such as that shown in FIG. 5, is disposed with its sensitive axis directed along a vector 17 which is approximately pointing in the geographic eastward direction 18 but displaced from the east vector 18 by an unknown angle z. In the illustrated embodiment (FIG. 5), the gyro having an east-west input axis is designated 73b. The approximate eastward direction can usually be determined easily by means of a compass or other approximate indicator and the east-west input axis gyro can be maintained quite accurately level by known means at any latitude, e.g., by slaving the stable platform to local horizontal.

In the second step the rate of inertial precession necessary to maintain the attitude and heading of the east-west input axis gyro constant about vector 17 is detected and noted and this quantity is equal to $(W_H \Lambda \sin z) + D$ where D is the drift rate of the gyro about axis 17, and intrinsic characteristic of the gyro substantially independent of $\Lambda$ and z.

In the third step, the sensitive axis of the east-west input axis gyro is displaced in azimuth from vector 17 by a known angle $\theta$ that is approximately 180°. In this third step the rate of precession of the gyro in its new position is then detected, this quantity being equal to $$[W_H \sin (z+\theta)] + D$$

At the completion of the third step, therefore, there are obtained two measured quantities which can be referred to as $R_1$ and $R_2$ with:

$$R_1 = [W_H \sin z] + D$$

and $$R_2 = [W_H \sin (z+\theta)] + D$$

Observing these equations, it is noted that there now are obtained two simultaneous equations with only two unknown quantities z and D since all other quantities are known or measured.

$W_H$ is the horizontal component of the angular velocity of the earth, i.e., the earth rate.

$\Lambda$ is the latitude of position 10 and is a known or determinable quantity. ($\theta$, the angle through which the platform is turned in azimuth in step 3, is measured by the platform azimuth pickoff.)

Consequently, in a final step the two simultaneous equations are solved and the error angle z is determined whereby the displacement of vector 17 from true geographical east is determined and knowing true east, the direction of true north is determined.

According to a second method for performing the invention, the process may be simplified somewhat over the first method. In the second method, the east-west input axis gyro is disposed with its sensitive axis along vector 17, as before, and the rate of precession necessary for maintaining this orientation and heading is detected and noted as before. This yields the quantity $R_1$ which is proportional to $[W_H \sin z] + D$ as indicated above. However, rather than displacing the element by 180° to obtain the second equation, the quantity $W_H$ is calculated, since the earth rate $\omega_e$ is known, as well as the latitude angle $\Lambda$. The drift rate D may be neglected and the equations then solved for sin z or z; if the drift rate is known or is determinable then the error angle z may be found more accurately and the true geographical north thereby located.

Figure 2:
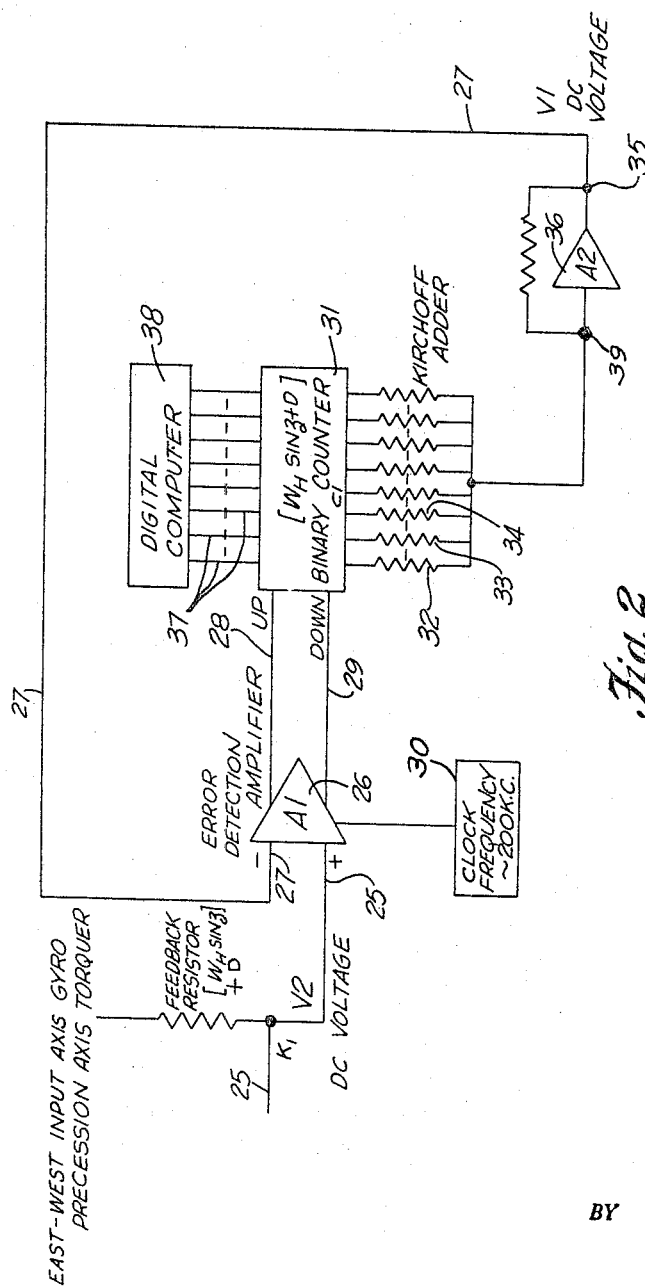
FIG. 2 is a schematic illustration, partially in block diagram form, illustrating one preferred digitally operating system employed in practicing the invention.

FIG. 2 illustrates one preferred system employing the invention for rapidly aligning a typical gyro controlled stabilized platform to the true northward heading.

One typical gyro stabilized platform shown in FIG. 5 generally comprises a platform that is pivotally supported in a fixed frame for rotation about three orthogonal axes, such as pitch, roll and yaw (or azimuth) axes 70, 71, 72, respectively. On this platform is carried a plurality of gyroscopes 73a, 73b, 73c connected in feedback by means of pickoffs $P_a$, $P_b$, $P_c$ and torquer motors $T_a$, $T_b$ to control and stabilize the attitude and heading of the platform. For purposes of the present invention, such a platform for an inertial guidance system would include a first vertical output axis gyro 73a having a sensitive axis for the north-south axis and a second vertical output axis gyro 73b at right angles thereto for detection along the east-west axis. The platform is slaved to local horizontal with conventional erection servos in a manner well-known in the art. Each horizontal input axis gyro is in an accelerometer-horizontal input axis gyro first order erection loop.

According to the present invention a system is provided for rapidly aligning such a platform in a true geographical north pointing direction and one preferred digitally operating system is shown in FIG. 2.

To commence this rapid alignment of the platform, the platform is initially erected to a horizontal position tangent to the earth's surface and maintained in this position despite rotation of the earth by precessing the north-south input axis gyro (73a, FIG. 5) with a signal proportional to the appropriate earth rate $W_H$. Since the correct north-south earth rate compensation varies as the cosine of the true heading or $W_H \cos z$ (vector 16 in FIG. 1), the approximate earth rate correction error signal $W_H$ results in a negligible verticality error if the platform is approximately aligned in the northward pointing direction and is displaced from true north by only a small error angle z. This approximate alignment of the platform may be initially performed by using a compass or the like.

With the platform maintained horizontal in the east direction by the north-south input axis gyro and approximately in true north pointing direction, the gyro having its input axis in the east-west direction is rotated by a signal directed to its precession axis torquer that is equal to:

$$W_H \sin z + D$$

where the angle z is the error angle between true east and the sensitive axis of the gyro and D is the drift of the gyro.

Returning to FIG. 2, this precession signal is also directed over line 25 to a gated chopper differential amplifier 26 which serves the purpose of converting the difference or error between the signals fed into input line 25 and a second input line 27 into regularly time spaced incremental output pulses over lines 28 and 29, with the pulses over line 28 being produced whenever the amplitude of the input signal over line 25 exceeds that over line 27 and with the pulses over line 29 being produced when the amplitude of the input over line 27 exceeds that over input line 25.

The gated differential chopper amplifier 26 is a circuit known in the prior art having a pair of input lines and a pair of output lines, with each of the latter lines normally producing a constant amplitude signal when the signal over a different one of the input lines exceeds that over the other. To convert this output signal into regular time spaced pulses, the amplifier 26 is independently controlled in an on-off manner by a clock frequency generator 30 which biases or otherwise enables and disables the amplifier at the rate of the constant clock frequency.

The error pulses over output lines 28 and 29 leading from the chopper amplifier 26 are then directed to the opposite input terminals of a reversible counter 31 whereby the pulses over line 28, for example, are additively summed by counter 31 and those over line 29 are subtractively accumulated. In this manner, there is stored in the counter 31 the differential between the number of pulses over lines 28 and 29 whereby the combination of chopper amplifier 26 and reversible counter 31 provides an analog-to-digital converter and the count stored in counter 31 is the digital equivalent of the east-west gyro precession current signal.

The reversible counter 31 is preferably, but not necessarily, comprised of a plurality of binary flip-flop stages connected in cascaded relation to be triggered in sequence in a forward direction in response to pulses over line 28 and in the reverse direction, or subtractively, by pulses over line 29. Consequently, the sum standing in the counter 31 is the differential between the sum of the pulses over the two lines 28 and 29.

After summing a number of impulses proportional to the digital equivalent of the analog voltage over line 25, it is necessary that a feedback signal be returned to amplifier 26 indicating that the correct count has been entered in counter 31. This feedback signal is obtained by reconverting the digital count which is stored in counter 31 to an analog signal and comparing this analog signal with the gyro torquing signal. For reconverting the count into analog form, a plurality of resistors such as 32, 33, 34 are each connected to a different one of the counter stages, and the opposite terminal of each of said resistors is connected to a common summing junction point 39 whereby the signal at point 35 is in analog form and is the analog equivalent of the count stored in counter 31. This analog signal at junction 35 is directed through an accurate feedback amplifier 36 and returned over line 27 leading to the second input of chopper amplifier 26. Consequently, the chopper amplifier 26 receives a first analog signal over line 25 equal to the gyro signal and a second analog input signal over line 27 equal to the count standing in the counter 31 whereby the count standing in counter 31 is rapidly varied by adding pulses or subtracting pulses always to equal the gyro signal. Since the east-west input axis gyro precession signal over line 25 is equal to $W_H \sin z + D$, the count standing in counter 31 is likewise equal to the digital equivalent of this quantity, and this count is fed over lines 37, connecting each stage of counter 31, to a digital computer 38 whereby the quantity equal to $W_H \sin z + D$ is stored in the digital computer 38.

In the next step the platform containing the east-west gyro is then displaced approximately 180° in azimuth. After displacement of the platform as described, the east-west gyro precession signal is again directed over line 25 to the analog-to-digital converter shown in FIG. 2, where the analog signal is converted to digital form and the digital quantity is stored in digital computer 38. However, in this case, the digital quantity stored is equal to $$[W_H \sin (z+\theta)] + D$$

where the angle $\theta$ is the azimuth angle through which the platform has been turned in azimuth. As previously mentioned, $\theta$ is measured by the platform azimuth gimbal angle transducer and stored in the digital computer 38.

As a result, there are stored in the digital computer 38 two equations having two unknowns:

$$R_1 = [W_H \sin z] + D$$
$$R_2 = [W_H \sin (z+\theta)] + D$$

wherein $R_1$ and $R_2$ are respective stored values in the computer which solves these equations to determine the error angle between the east-west gyro sensitive axis and true geographic east.

Considering in greater detail the overall procedures in aligning the platform heading, it is first desired (prior to alignment) to ready the system and components for operation. When floated gyros are employed, this is performed by maintaining the heating coils (not shown) on the platform energized and also exciting the normally three phase motor windings on the gyros with single phase power, to raise the gyros to operating temperature even though the gyro motors are not turning. This pre-heating enables the gyros to achieve their maximum drift performance very rapidly after the platform is placed in operation.

When it is desired to align the platform to a true north heading, three phase excitation power is applied to the gyros and system operation commences with relays controlling sequential power operation.

After erection of the platform, the platform is then oriented in an approximately true northward heading direction by employing a flux valve magnetic compass or the like. Thereafter, the information taken from the precession torque of the east-west input axis gyro is employed to determine accurately the platform heading relative to true north as described above.

Figure 3:
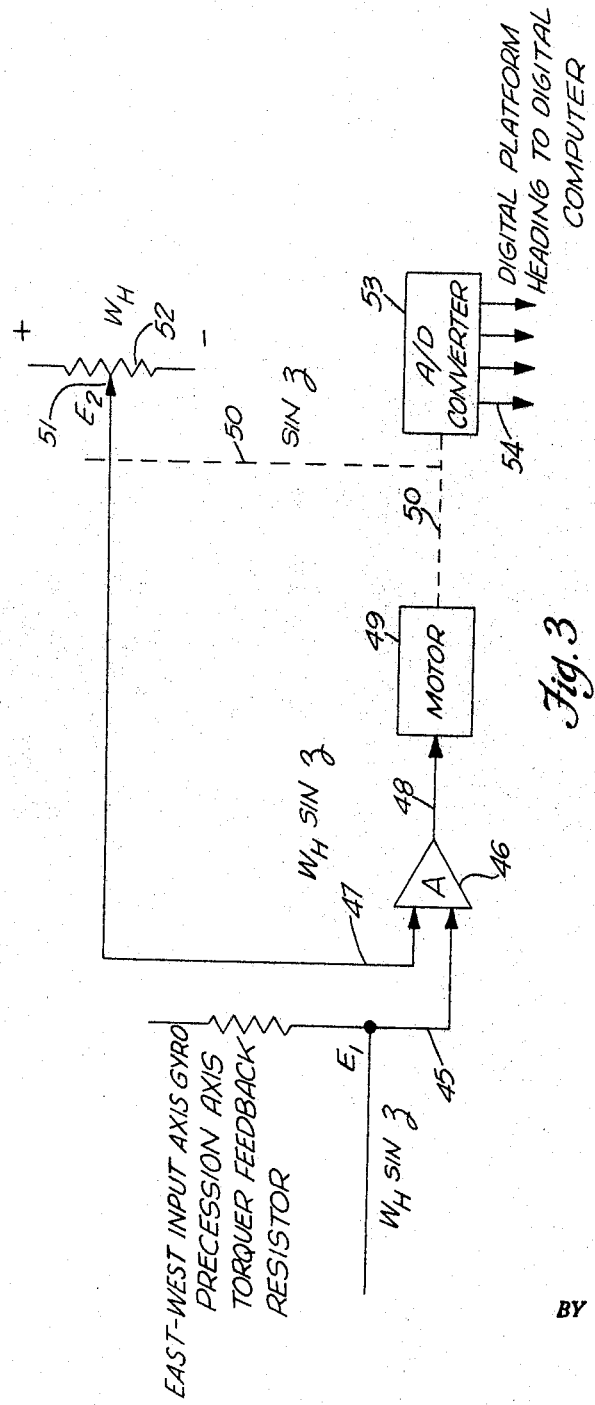
FIG. 3 is a schemactic drawing, for illustrating an analog system for practicing the invention.

FIG. 3 illustrates an alternative servo system for determining the true north heading employing the precession of the east-west input axis gyro. In this system the analog signal from the input axis gyro precession axis torquer of the east-west input axis gyro is introduced over line 45 to an analog differential amplifier 46 where it is compared with a calculated signal over line 47 equal to $(W_H) \sin z$ the product of earth's velocity and the cosine of the angle of latitude and the sin of $z$.

The difference signal produced by amplifier 46 over output line 48 energizes motor 49 whereby its shaft, indicated as 50, is rotated in response to this error quantity.

Shaft 50 positions the slider or tap 51 of an energized feedback resistor 52 which is energized by the calculated quantity $W_H$. Consequently, the feedback signal over line 47 and energizing amplifier 46 is adjusted to always equal the input signal over line 45 to balance the system. The motor shaft 50 also is directed to an analog to digital converter 53 serving to convert the shaft position, equal to $\sin z$ or approximately $z$, into a digital output over lines 54.

Figure 4:
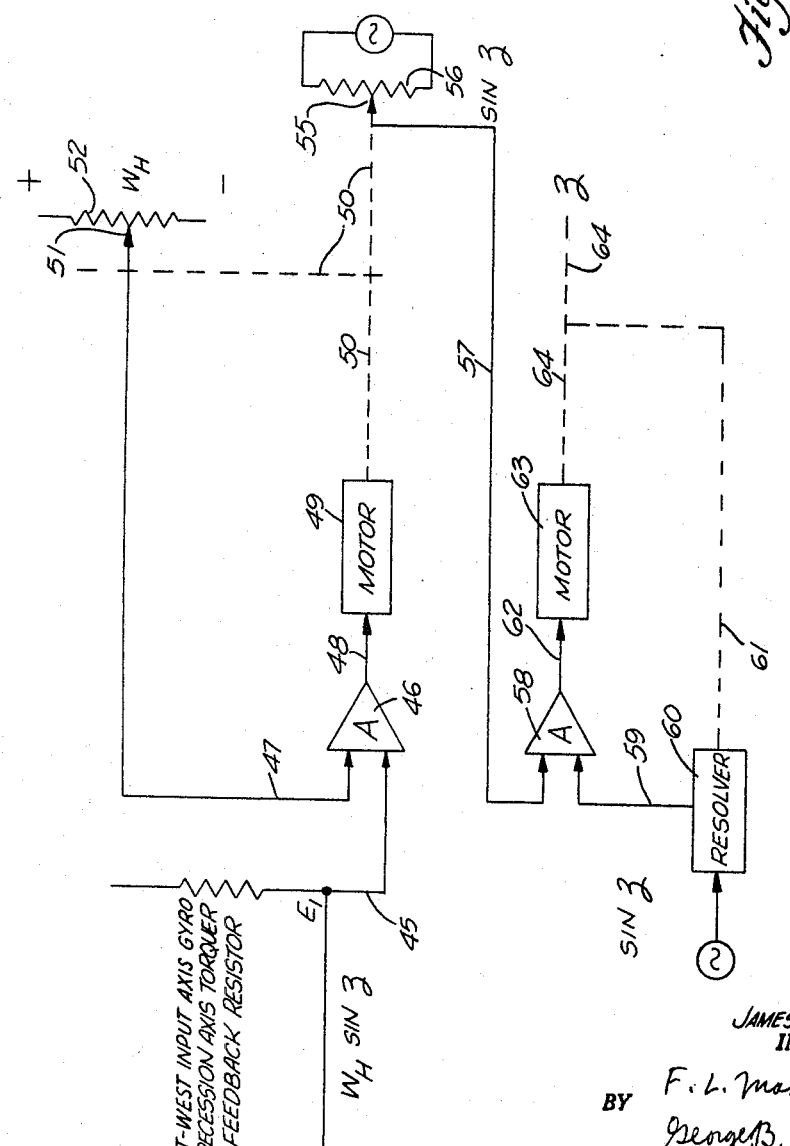
FIG. 4 is an electrical schematic drawing, similar to FIG. 3, and illustrating a modification thereof.

FIG. 4 illustrates a system similar to FIG. 3 but additionally incorporating analog means for converting the sine of an angle $z$ into the error angle $z$ directly for enabling the automatic determination of the platform heading relative to a true northward direction. The first portion of this servo system is the same as in FIG. 3 and the components thereof are similarly numbered.

In this system, however, the motor shaft 50 positions the slider 55 of an energized potentiometer 56 to produce an analog signal over line 57 proportional to the sine of the angle $z$.

The signal over line 57 is directed to a differential amplifier 58 which is also energized by the output signal over line 59 of an electromechanical resolver 60 which produces an output proportional to the sine of the angle of rotation of its shaft 61. The difference between the signals over lines 57 and 59 is directed over amplifier output line 62 to energize motor 63 whose output shaft 64 is rotated by an angle and in such direction that the output signal of resolver 60 over line 59 is made equal and opposite to the signal over line 57. Due to the action of resolver 60, this angle of rotation of shaft 64 (and shaft 61) is equal to the error angle $z$, and consequently the angle of rotation of motor shaft 64 is the desired angle $z$ between the sensitive axis of the east-west input axis gyro and the true geographic east as desired.

What is claimed is:

In combination with a gyroscopically stabilized platform having at least one gyro with a horizontal input axis and a vertical output axis, means for the initial establishing and maintaining of the platform in a level condition with the input axis of said one gyro approximately aligned in the east-west direction and means for measuring, as a first electrical signal, the rate of precession of said one gyro;

computer means to produce a difference signal representative of the misalignment angle between said gyro input axis and a true east-west heading, said computer means comprising in combination:

adjustable means for generating a second electrical signal representative of the earth's rate and one sinusoidal function of the local angle of latitude;

comparator amplifier means to which are fed said first and second electrical signals producing a third electrical signal representing the difference between said first and second signals;

moving means responsive to said third signal acting on said adjustable means so as to so position said adjustable means that the second signal generated therefrom equals said first signal which positioning produces a fourth signal corresponding thereto; and, conversion equipment responsive to said fourth signal providing a converted value corresponding to said motion performed, including:
    a resolver producing a fifth signal corresponding to the rotation thereof;
    a differential amplifier to which are fed said fourth and fifth signals, said differential amplifier producing a sixth signal which is the difference between said fourth and fifth signals;
    second moving means energized by said sixth signal acting to turn said resolver so that the angle of rotation and direction thereof is such that said fifth signal from the resolver is equal to and opposite said fourth signal, the angle of rotation of said resolver then corresponding to the angle between said gyro sensitive axis and the true geographic east-west axis.

References Cited

UNITED STATES PATENTS 3,127,774    4/1964    Fischer et al.

MALCOLM A. MORRISON, *Primary Examiner.*

A. J. SARLI, M. P. HARTMAN, *Assistant Examiners.*